No. 631,534. Patented Aug. 22, 1899.
L. F. STANTON.
VEHICLE AXLE.
(Application filed Oct. 4, 1898.)
(No Model.)
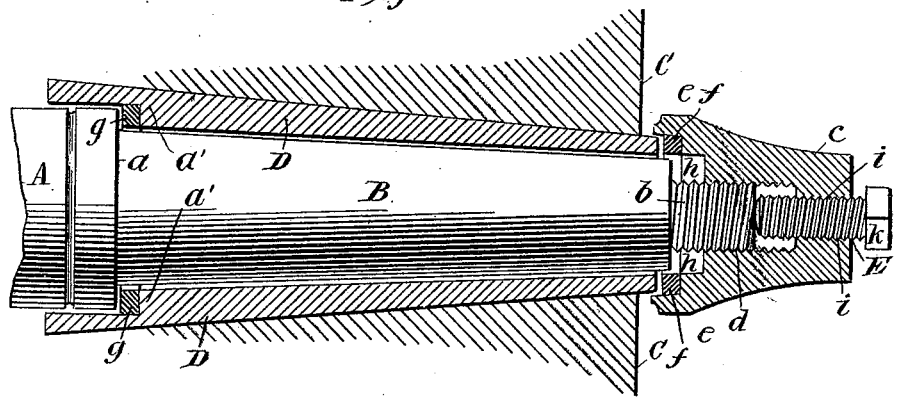
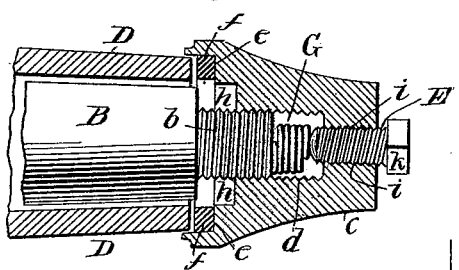
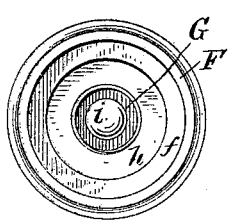
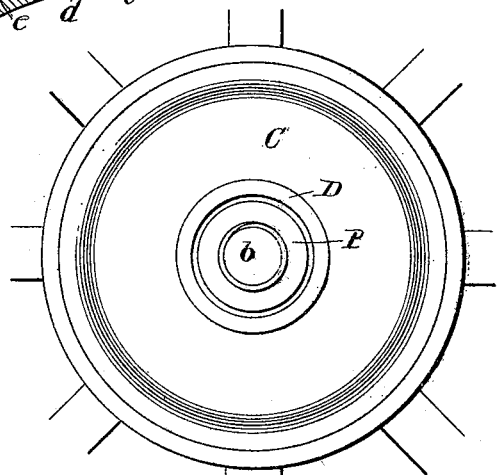
Witnesses:
C. L. Belcher
A. F. Roussel
Inventor
Lafayette F. Stanton
By his att'y James A. Whitney
THE NORRIS PETERS CO., PHOTO-LITHO., WASHINGTON, D. C.

United States Patent Office.

LAFAYETTE F. STANTON, OF ONEONTA, NEW YORK.

VEHICLE-AXLE.

SPECIFICATION forming part of Letters Patent No. 631,534, dated August 22, 1899.

Application filed October 4, 1898. Serial No. 692,603. (No model.)

*To all whom it may concern:*

Be it known that I, LAFAYETTE F. STANTON, a citizen of the United States, residing at Oneonta, in the county of Otsego and State of New York, have invented certain new and useful Improvements in Vehicle-Axles, &c.; and I do hereby declare that the following is a full, clear, and exact description of the same, reference being had to the accompanying drawings, making a part of this specification, in which—

Figure 1 is a longitudinal sectional view of an apparatus made according to my invention. Fig. 2 is a similar view illustrating an additional feature of my invention. Fig. 3 is a view of the inner face of a nut which forms part of said apparatus; and Fig. 4 is an end view of the journal and box, which are also included in said apparatus.

This invention relates to the journals or bearings of the axles of wheeled vehicles, such as carriages, wagons, and the like, in which a box usually of tapering form provided in the interior of the wheel-hub is placed upon a journal of corresponding configuration and held in place by a nut provided at the outer end of the journal. In the use of and operation of these parts the shoulder at the inner end of the journal and the adjacent end of the box are worn away by friction or attrition upon one another, and in a similar manner the outer end of the box is worn away by the moving contact with the contiguous surface of the nut. In this way the journal gradually becomes longer and the box shorter, so that there is brought about an excessive sliding movement of the hub upon the journal, which very greatly injures the efficiency of the vehicle and lessens the durability of the parts. Ordinarily it has been attempted to remedy these disadvantageous results by from time to time cutting away the outer end of the journal to permit the nut to crowd the box farther inward upon the journal, and thus destroy its elongation relative to the box. This operation is expensive and is effective only to a moderate degree.

The object of my invention is to rectify the evils just hereinbefore set forth by means which permit the wear of the parts to be compensated by their easy and convenient adjustment, thereby doing away with the inconvenient and costly method heretofore in general use.

To this end my invention comprises certain new and useful combinations of parts hereinafter fully described.

A is a carriage, wagon, or other axle of any ordinary or suitable construction, provided with a bearing or journal B, which carries the hub (indicated at C) of a wheel, which latter may be of any appropriate character. As shown in the drawings, the journal is of the tapering form usually approved in wagons, carriages, and the like. Provided to the axle at the inner end of the journal is the annular or circumferential shoulder $a$, which in a manner well understood in the art limits the inward movement of the hub upon the journal by receiving the inward thrust or impact of the inner end or shoulder $a'$ of the box D, which is placed in the usual manner in the hub and which of course conforms to the taper and configuration of the journal. At the outermost end of the journal, in or substantially in the axial line of the journal, is a screw $b$, which is fixed in its relation to the journal and by means of which the retaining-nut E is applied to hold the box, and consequently the wheel, upon the journal.

The nut F is so shaped at its outer end $c$ as to enable it to be readily turned in applying it to the fixed screw $b$. The inner end of this nut F has an internal screw-thread $d$ to enable, as just mentioned, the nut to be applied to the screw $b$. Concentric with this screw-threaded bore $d$ of the nut and in the inner face of the latter is an annular chamber $e$, in which is placed a washer $f$, of leather or other suitable material, against which bears the outer end of the box D, as shown in Fig. 1. When it is desired that the nut come into immediate contact with the end of the box, this chamber $e$ and washer $f$ may be dispensed with, but their use is to be preferred. A like remark applies to a washer $g$, which is placed in an annular seat in the inner end of the box to bear in contact with the shoulder $a$. Also provided in the inner end of the nut, concentric with, but larger than, the threaded bore $d$, is an annular chamber $h$, which is so proportioned that on occasion the outer end of the journal B may extend into it in the manner and for the purpose presently to be herein explained. Extended through the nut from the bore $d$ to the outer end of the nut is a secondary bore $i$, which is internally screw-threaded to receive a jam-bolt E, the head $k$ of which is adapted to receive a wrench when the jam-bolt is to be turned. Normally the inner end of this jam-bolt rests against the outer end of the screw $b$ when the apparatus is constructed as shown in Fig. 1. The thread of the secondary bore $i'$ and of its jam-bolt F has a pitch different from that of the bore $d$ and screw $b$.

The operation of the invention is as follows: When the parts have worn so that the box D is too loose upon the journal B or has too great a longitudinal movement thereon, the jam-bolt is turned back to recede to the requisite degree from the end of the screw $b$, and the nut E is then turned to adjust the box in an inward direction along and upon the journal B to the position in which the journal and the box are in the required relation with each other to compensate for the wearing away, hereinbefore explained, of the parts, the chamber $h$ of the nut receiving the projecting outer end of the journal, so that the nut may be brought to its new position to confine the box, and consequently the hub, in its proper location upon the journal without cutting away or removing any part of the latter. When the nut has been thus adjusted, the jam-bolt E is turned to bear snugly against the end of the screw $b$, and this jam-bolt prevents the loosening of the nut E upon the screw $b$ during the vicissitudes of use—as, for example, when the motion of the wheel, and consequently the movement of the box D, in its action against the nut is reversed. The best results are obtained when, as shown in the drawings, the secondary bore, and consequently the jam-bolt, is of less diameter than the screw $b$ and when the pitch of the screw-thread of the jam-bolt differs from that of the screw $b$.

In Fig. 2 is shown a further feature of my invention, which consists in the interposition of a spring G between the jam-bolt and the screw $b$, by which the pressure of the jam-bolt in retaining the nut in place is made somewhat elastic and the jarring impact upon the jam-bolt is softened without in any way impairing its effective pressure upon the screw $b$ and with the advantage of neutralizing any tendency, where such exists, to the loosening of the jam-bolt by reason of such jarring in the use and operation of the apparatus. The spring $g$ may be of any suitable kind or character, either of metal or, as shown in the drawings, of india-rubber or other elastic or resilient material.

What I claim as my invention is—

1. The combination with a journal having a screw, $b$, a box placed on said journal and a nut placed on said screw constructed with a chamber, $h$, to receive the adjacent end of the journal when the box is adjusted in an inward direction thereon and with a threaded secondary bore, $i$, of a jam-bolt, placed in said secondary bore, and a spring interposed between the jam-bolt and the screw, $b$, substantially as and for the purpose herein set forth.

2. The combination with a journal having a screw $b$, and a box placed on said journal, of a nut placed on said screw, constructed with a chamber, $h$, to receive the adjacent end of the journal when the box is adjusted in an inward direction upon the journal, and with a threaded secondary bore of less diameter than that which receives the screw, $b$, of a threaded jam-bolt placed in said secondary bore, and having a thread of a pitch different from that of the screw, $b$, and a spring interposed between the inner end of the jam-bolt and the outer end of the screw, $b$, substantially as and for the purpose herein set forth.

LAFAYETTE F. STANTON.

Witnesses:
LLOYD R. STANTON,
A. RAYMOND GIBBS.